No. 839,061. PATENTED DEC. 18, 1906.
H. FARJAS.
APPARATUS FOR APPLICATION OF SALTS OF RADIUM.
APPLICATION FILED FEB. 23, 1905.
2 SHEETS—SHEET 1.
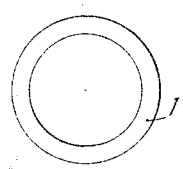
Fig. 1.
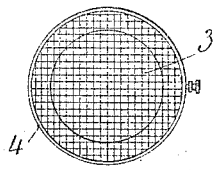
Fig. 2.
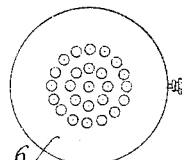
Fig. 3.
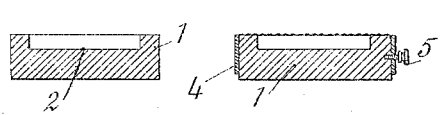
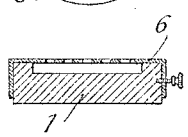
Fig. 4.
Fig. 5.
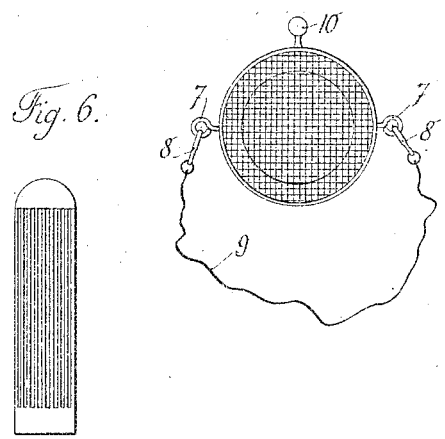
Fig. 6.
Fig. 7.
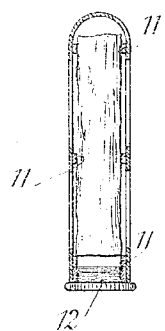
Witnesses
P. F. Nagle
L. Douville
Inventor
Henri Farjas
By Wiedersheim & Fairbanks
Attorneys No. 839,061. PATENTED DEC. 18, 1906.
H. FARJAS.
APPARATUS FOR APPLICATION OF SALTS OF RADIUM.
APPLICATION FILED FEB. 23, 1905.
2 SHEETS—SHEET 2.
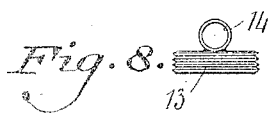
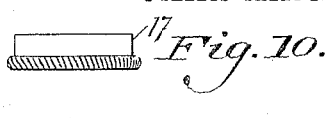
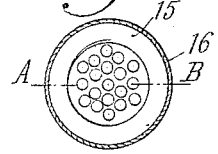
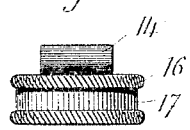
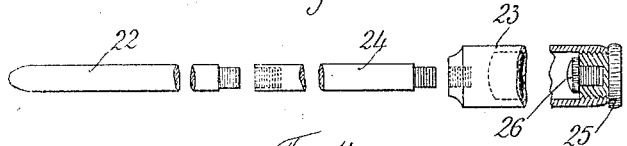
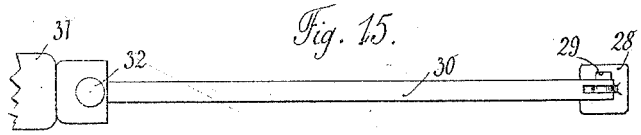
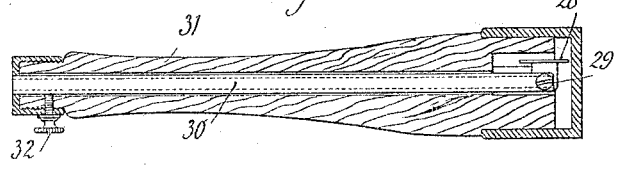
Witnesses:
P. F. Nagle.
L. Douville.
Inventor:
Henri Farjas,
By Wiedersheim & Fairbanks
Attorneys.

UNITED STATES PATENT OFFICE.

HENRI FARJAS, OF PARIS, FRANCE.

APPARATUS FOR APPLICATION OF SALTS OF RADIUM.

No. 839,061. Specification of Letters Patent. Patented Dec. 18, 1906.

Application filed February 23, 1905. Serial No. 246,903.

*To all whom it may concern:*

Be it known that I, HENRI FARJAS, engineer, a citizen of the French Republic, residing at 13 Rue Vignon, Paris, France, have invented certain new and useful Improvements in Apparatus for the Application of the Salts of Radium and other Radio-Active Substances, of which the following is a specification.

For the utilization of the salts of radium and other radio-active substances, more especially for medical purposes, such substances are inclosed in a receptacle of glass, ebonite, celluloid, aluminium, or the like. Notwithstanding, however, that the walls of said vessels are made as thin as possible, the radiation is diminished to a considerable extent by the screen thus interposed. For example, with a wall of 0.1 millimeter of aluminium the loss is about ninety per cent. With a wall of 0.3 millimeter of ebonite the loss is also ninety per cent. Glass likewise causes a large loss. In addition to this loss by the employment of such vessels the $\beta$ and $\gamma$ rays only are utilized, and the effect of the $\alpha$ rays, which would appear to present the greatest bactericide effect, is totally lost.

From the foregoing it follows that it is exceedingly desirable to dispense with the screen, while at the same time applying the radio-active substance as near as possible to the point upon which it should act.

Now my present invention has for its object to obviate these defects, and in order that the same may be readily understood and carried into effect by those skilled in the art to which it appertains I will describe said invention with reference to the accompanying drawings, in which—

Figure 1 illustrates, in plan and in section, a holder 1 of wood or other suitable material, the bottom 2 of which may be covered with radio-active substance maintained in place by means of an appropriate cement.

The following are, among others, two methods which may be employed: The bottom of the holder may be coated with a varnish which is dusted while still liquid, with radio-active matter reduced to a fine powder, or the radio-active substance may be placed in a mortar with a few drops of bronzing varnish and crushed until it forms a soft paste, which is applied by means of a brush upon the bottom of the holder.

It will of course be understood that other similar means may be employed. The two methods mentioned above are indicated because they have been found to give good results.

In this manner the radio-active substance is protected from the air or separated therefrom by a coat of varnish so thin that the whole of the rays or almost the whole of them may be utilized. In this way it is possible to effect economies in the cost of the radio-active substance or to obtain a greater effect when the high activities are employed.

In order to protect the substance from accidents of all kinds, the holder 1 may be covered with a washer of canvas 3 or of metallic gauze the meshes of which are, say, two millimeters wide and which is maintained in place by a ring 4, fixed by a screw 5, Fig. 2. The holder 1 may also be covered with a metal cap 6, provided with holes or slits, Fig. 3.

Owing to the relatively large dimensions of the meshes, holes, or slits, the activity of the substance is hardly diminished.

The holder may be screw-threaded either at its lower part, as shown in Fig. 4, in such a manner as to adapt it to be screwed onto a handle or at various parts of its periphery, Fig. 5, for the reception of an eye 7 for its suspension, or of two eyes serving by means of swivel-hooks 8 and an elastic cord 9 for attaching it to any desired point, or, again, it may be provided with a ball-joint 10, engaging in a clamp.

The holder may vary in form in accordance with the purpose for which the apparatus is intended. It may be round, oval, square, rectangular, cylindrical, &c. In cases in which it is cylindrical it is provided with slits, as shown in Fig. 6. A sheet of paper covered with a coat of radium is engaged in the cylinder, the coated side being directed outward. Cotton is stuffed into the cylinder in order to maintain the paper applied against the wall. The cylinder may also present internal ribs 11, Fig. 7, which slightly separate the paper from the wall. The slits should be as narrow and as close together as possible, as the appliance is intended in this case to be introduced into cavities, and the ribs prevent the fall of radio-active material within these cavities. If particles of material become detached from the paper, they remain inside the cylinder, as this latter is generally utilized in a vertical position. The screw-plug 12, which is replaced by a handle when the appliance is in use for operations, closes the extremity of the cylinder. The holder may also be in three parts, Figs. 8 to 11, a central disk, Fig. 8, a washer provided with a perforated bottom, Fig. 9, and a protecting-cap, Fig. 10.

The central disk 13 is solid and screw-threaded at its periphery. On one side it carries a cylindrical tube 14, and upon the other side the radio-active substance is fixed by means of an appropriate varnish. It screws into the washer 15, the bottom of which is perforated. This bottom may, however, be dispensed with. The washer is milled, as at 16, and is provided with screw-threads permitting of screwing it into the cap 17. This latter is used during transport—that is to say, when the apparatus is disposed as shown in Fig. 11—in order to prevent the radio-active substance from emitting dangerous rays. Owing to its thickness, the disk 13 produces the same effect.

Owing to the arrangement adopted, the disk 13 is able to screw to a greater or less extent into the washer 15 (with or without a perforated bottom) in such a manner that the radio-active substance is brought nearer to or farther away from the part to be treated. By dispensing with the washer 15 the disk 13 may even be applied to this part either directly or with the interposition of a sheet of paper or some other more or less permeable screen. The appliance may be applied to the part to be treated either by hand, by the intermediary of the cylindrical tube 14, or by means of a handle engaged in this tube, or, finally, by means of a flexible connection traversing the tube. The disk 13 may also be carried by two arms 18, Fig. 12, each provided with a trunnion 19, entering the tube 14. The arms 18 are connected by a screw 20 to a rod 21, which the operator holds in his hand. The disk 13 may also occupy any desired position and even effect a complete revolution around the trunnions 19.

In order to cause the radio-active substances to act at the bottom of cavities of small diameter, this substance is fixed to the extremity of a solid cylinder 22, Fig. 13, which is screwed to the extremity of a metal handle 23 or extension-piece 24. For transport the cylinder 22 is screwed into the plug 25, which is itself screwed into the handle 23. The milled stud 26 is screwed at the extremity of the sleeve 23 in place of the extension-piece 24 or of the cylinder 22. The handle 23 is of sufficient thickness to obviate any dangerous radiation. The cylinder 22 may be replaced by a solid sphere 27, Fig. 14, carrying the radio-active substance fixed to its periphery.

When it is desired to treat, for example, the mucous membranes of the mouth or throat, the radio-active substance is fixed to a plate 28, oscillating around a spindle 29 and carried by a tube 30. This latter during the operation is partially engaged in the extremity of a handle 31 and held by a set-screw 32, Figs. 15 and 16. Owing to the oscillation of the plate 28 and to the rotation given to the apparatus by the operator, the radio-active substance may be placed so as to act upon a surface occupying any position.

For transport the rod 30 is engaged in the handle 31 and likewise held by the screw 32. The handle for the reception of the plate 28 presents a cavity of appropriate form, which is covered by a lid 33, which may be fitted by forcing it tightly in if the handle is of wood. If this handle 31 is of metal, the lid 33 is longer than in the foregoing case and screws upon it. The portion of the handle that surrounds the plate 28 may then be dispensed with.

In these appliances sulfate of radium is employed in preference to the bromid or chlorid.

What I claim, and desire to secure by Letters Patent of the United States, is—

1. In apparatus for the application of salts of radium and other radio-active substances a holder having the interior thereof coated with a radio-active substance and provided with a permeable protecting-screen substantially as specified.

2. In apparatus for the application of salts of radium and other radio-active substances, the combination with a holder having the interior thereof coated with a radio-active substance, a permeable protecting screen or washer and means for attaching said screen to the holder substantially as described and for the purpose specified.

3. In apparatus for the application of salts of radium and other radio substances, a holder having the interior thereof coated with a radio-active substance, a permeable protecting-screen, and means for attaching said screen to the holder, in combination with a handle and means for attaching said handle to the holder substantially as and for the purpose specified.

4. In apparatus for the application of salts of radium and other radio-active substances, a holder having the interior thereof coated with a radio-active substance, a permeable protecting-screen, and means for attaching said screen to the holder, in combination with means for attaching the device to any desired point substantially as and for the purpose specified.

5. In apparatus for the application of salts of radium and other radio-active substances, a perforated holder for the radio-active substance and a permeable protecting-screen.

6. In apparatus for the application of salts of radium and other radio-active substances, a holder for the radio-active substance having perforations, and means for detachably connecting a supporting device.

In testimony whereof I have hereunto set my hand, in presence of two subscribing witnesses, this 6th day of February, 1905.

HENRI FARJAS.

Witnesses:
PAUL COULOMB,
GASTON FRANÇOIS.